United States Patent
Miyajima et al.

(10) Patent No.: US 7,280,507 B2
(45) Date of Patent: Oct. 9, 2007

(54) RADIO LAN DATA TRANSMISSION SYSTEM, RADIO LAN DATA TRANSMISSION METHOD, AND COMPUTER PRODUCT

(75) Inventors: Shinichirou Miyajima, Yokohama (JP); Kazuhiro Ichiyanagi, Kawasaki (JP); Akiko Kusumoto, Kawasaki (JP); Yuji Nagano, Yokohama (JP); Katsuhiro Eguchi, Yokohama (JP); Naoyuki Takeshita, Yokohama (JP); Yuji Ishii, Yokohama (JP); Kazuyuki Inomoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 582 days.

(21) Appl. No.: 10/780,577

(22) Filed: Feb. 19, 2004

(65) Prior Publication Data
US 2005/0013265 A1 Jan. 20, 2005

(30) Foreign Application Priority Data
Jul. 15, 2003 (JP) ............................. 2003-274463

(51) Int. Cl.
*H04Q 7/00* (2006.01)
*H04Q 7/24* (2006.01)
*H04L 12/28* (2006.01)

(52) U.S. Cl. ...................... 370/331; 370/328; 370/338; 370/389

(58) Field of Classification Search ................ 370/328, 370/338, 331, 389
See application file for complete search history.

(56) References Cited

U.S. PATENT DOCUMENTS

| | | | |
|---|---|---|---|
| 5,732,078 A * | 3/1998 | Arango | 370/355 |
| 6,188,701 B1 | 2/2001 | Tsukamoto et al. | |
| 6,292,480 B1 * | 9/2001 | May | 370/352 |
| 7,187,906 B2 * | 3/2007 | Mason et al. | 455/69 |
| 2004/0101035 A1 * | 5/2004 | Boer et al. | 375/219 |
| 2006/0218250 A1 * | 9/2006 | Nakase | 709/219 |

FOREIGN PATENT DOCUMENTS

| | | |
|---|---|---|
| JP | 11-122320 | 4/1999 |
| JP | 2001-358640 | 12/2001 |
| JP | 2002-112341 | 4/2002 |
| WO | WO 01/97465 | 12/2001 |

OTHER PUBLICATIONS

Notice of Rejection dated Dec. 12, 2006.

* cited by examiner

*Primary Examiner*—Barry Taylor
(74) *Attorney, Agent, or Firm*—Staas & Halsey LLP

(57) ABSTRACT

If a radio LAN apparatus moves from a communication range of a first access point to a communication range of a second access point, and if communication link between the radio LAN apparatus and the first access point is broken, a memory control section stops transmitting data to the first access point. At this time, data to be transmitted to the first access point are not deleted from memory. After the radio LAN apparatus enters the communication range of the second access point, the memory control section resumes transmission of the data stored in the memory. Thereafter, the next data are transmitted. Thus, the data is transmitted in proper sequence.

12 Claims, 25 Drawing Sheets

RADIO LAN DATA TRANSMISSION SYSTEM, RADIO LAN DATA TRANSMISSION METHOD, AND COMPUTER PRODUCT

CROSS-REFERENCE TO RELATED APPLICATIONS

This application is based upon and claims the benefit of priority from the prior Japanese Patent Application No. 2003-274463, filed on Jul. 15, 2003, the entire contents of which are incorporated herein by reference.

BACKGROUND OF THE INVENTION

1) Field of the Invention

The present invention relates to a technique of transmitting data between a mobile station (client) and a relay-station that are connected by a radio local area network (radio LAN).

2) Description of the Related Art

In a conventional radio communication apparatus, when a relay station receives data properly from a mobile station, an acknowledgement signal is returned to the mobile station, in order to secure continuity of data transmitted between the mobile station and the relay station. The relay station does not transmit the acknowledgement signal if it does not receive the data properly. When an acknowledgement signal is not received from the relay station, the mobile station stores the data in a memory and retransmits the data with the next data to be transmitted.

In a technique disclosed in Japanese Patent Application Laid-open No. 2002-112341, a relay station transmits an acknowledgement signal to a mobile station, for each data received from the mobile station. In this technique, however, efficiency of data transmission deteriorates because of additional transmission of the response signal. Moreover, communication load increases due to the need of transmitting each response signal, particularly when data are transmitted near a bandwidth limit, or when only a transmission environment of very low bandwidth can be secured. Furthermore, the communication may be broken due to the excessive transmission load.

SUMMARY OF THE INVENTION

It is an object of the present invention to solve at least the problems in the conventional technology.

A radio LAN data transmission system according to one aspect of the present invention includes a host station, a relay station having a plurality of access points, and a mobile station having a radio LAN apparatus that transmits data to and receives data from the host station via the relay station. The radio LAN apparatus includes a memory unit that temporarily stores transmission data that is data to be transmitted to an access point; and a memory control unit that provides a control to store the transmission data in the memory unit at the time of switching from one access point to another access point, and to transmit the transmission data to the another access point when the radio LAN apparatus establishes a communication link with the another access point.

A radio LAN data transmission method according to another aspect of the present invention is a method of transmitting data between a mobile station having a radio LAN apparatus and a host station, via a relay station having a plurality of access points. The method includes temporarily storing transmission data in the radio LAN apparatus; detecting whether a link between the radio LAN apparatus and any one of the access points is established; reading the transmission data stored when it is detected at the detecting that a link between the radio LAN apparatus and any one of the access points has been established.

A computer program according to another aspect of the present invention realizes the method according to the above aspect on a computer.

The other objects, features, and advantages of the present invention are specifically set forth in or will become apparent from the following detailed descriptions of the invention when read in conjunction with the accompanying drawings.

DETAILED DESCRIPTION

Exemplary embodiments of the present invention are explained in detail below with reference to the accompanying drawings. The present invention is not limited to the embodiments.

Figure 1:
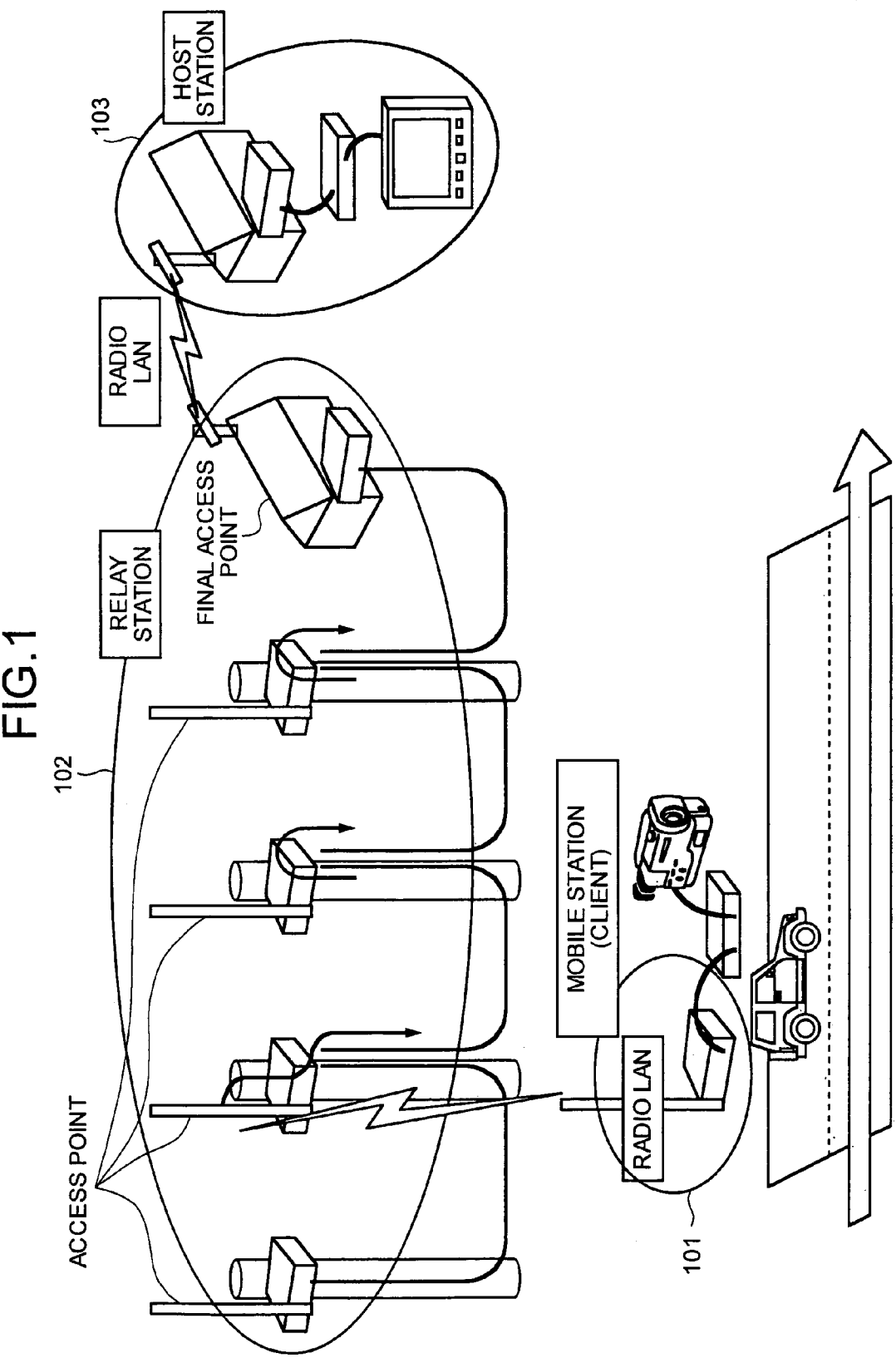
FIG. 1 illustrates a configuration of a radio LAN data transmission system according to an embodiment of the present invention.

FIG. 1 illustrates a configuration of a radio LAN data transmission system according to the present invention. This system includes a mobile station (client) 101 that can communicate via a radio LAN, a relay station 102 having a plurality of access points, and a host station 103. The access points of the relay station 102 are cascade-connected by a radio LAN cable. A final access point of the relay station 102 is connected with the host station 103 by a radio LAN. The access points of the relay station 102 may be connected with each other by a radio LAN. The final access point of the relay station 102 may be connected with the host station 103 by a cable LAN.

An image recorded by a video camera installed in the mobile station 101 is coded by a compressing technique such as MPEG2, and is transmitted as image data to any one of the access points in the relay station 102 via the radio LAN. The access point that receives the image data from the mobile station 101 transmits the image data to the final access point. The final access point transmits the image data to the host station 103. The host station 103 decodes the image data transmitted by the mobile station 101 so as to monitor the image in real time.

Figure 2:
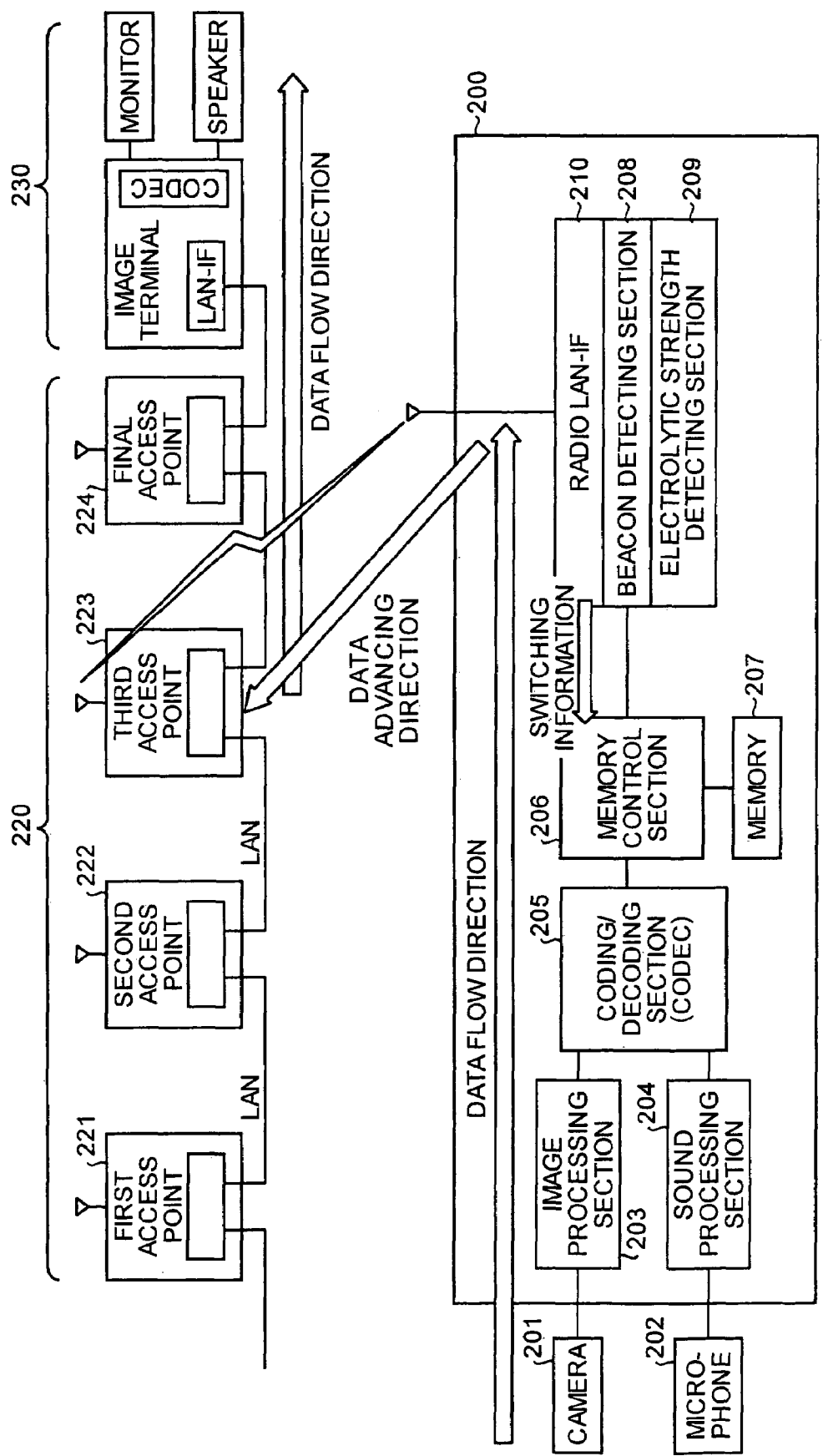
FIG. 2 is a detailed configuration of a radio LAN apparatus according to a first embodiment of the present invention.

FIG. 2 is a detailed configuration of a radio LAN apparatus installed in a mobile station of the radio LAN data transmission system according to a first embodiment of the present invention. The radio LAN apparatus 200 includes a camera 201, a microphone 202, an image processing section 203, a sound processing section 204, a coding/decoding section 205, a memory control section 206, a memory (such as FIFO (First In First Out)) 207, a beacon detecting section 208, an electrolytic strength detecting section 209, and a radio LAN interface 210.

An image recorded by the camera 201 is transmitted to the image processing section 203 for generating digitized image data. Sound acquired from the microphone 202 is transmitted to the sound processing section 204 for generating digitized sound data. The digitized image data and the digitized sound data are transmitted to the coding/decoding section 205 for coding. The coded data are transmitted to the memory control section 206. The memory control section 206 receives the coded data and stores them into the memory 207 one after another. The memory control section 206 reads the coded data stored in the memory 207 one by one, and transmits them to any one of the access points in the relay station 220 via the radio LAN interface 210. In the radio LAN apparatus 200, data are transmitted to an access point in the same sequence as the data are stored in the memory 207. In other words, the data are stored and read from the memory 207 in a first-in-first-out manner. The beacon detecting section 208 detects whether a link between the radio LAN apparatus 200 and the access points in the relay station 220 is established. The electrolytic strength detecting section 209 detects electrolytic strength of a radio wave transmitted from the access point in the relay station 220.

The relay station 220 has a plurality of access points. For example, a first access point 221, a second access point 222, a third access point 223, and a final access point 224 are shown in FIG. 2. The final access point is connected with the host station 230 via a LAN cable.

Figure 3:
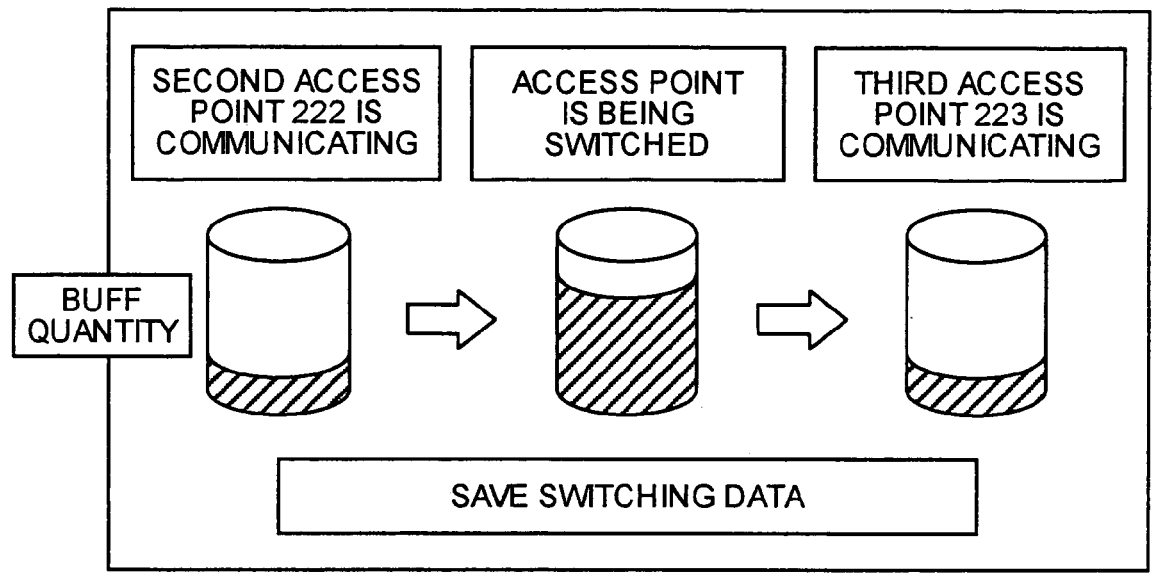
FIG. 3 illustrates views of memory usage in the radio LAN apparatus.

The access point connected with the radio LAN apparatus 200 in the mobile station can be switched. Though the time required for the switching is about 0.5 to 3 seconds, but the communication with the access point is disconnected during this time. Thus, continuity of data transmission cannot be secured. Consider an example when the radio LAN apparatus 200 is moved from a communication range of the second access point 222 to a communication range of the third access point 223. If the communication between the radio LAN apparatus 200 and the second access point 222 is disabled, the memory control section 206 stops data transmission to the second access point 222 and keeps the transmission data stored in memory. At this time, as shown in FIG. 3, quantity of data stored in the memory 207 increases in comparison with that when the data transmission is continued. However, capacity of the memory 207, which is about 2 Megabytes, is sufficient for storing the data that is not transmitted during the interruption period of about 3 seconds. After the radio LAN apparatus 200 enters the communication range of the third access point 223, the memory controls section 206 restarts the transmission of untransmitted data stored in the memory 207. Thereafter, the next data is transmitted. As a result, the image data can be transmitted continuously, and high quality of the image can be maintained.

Figure 4:
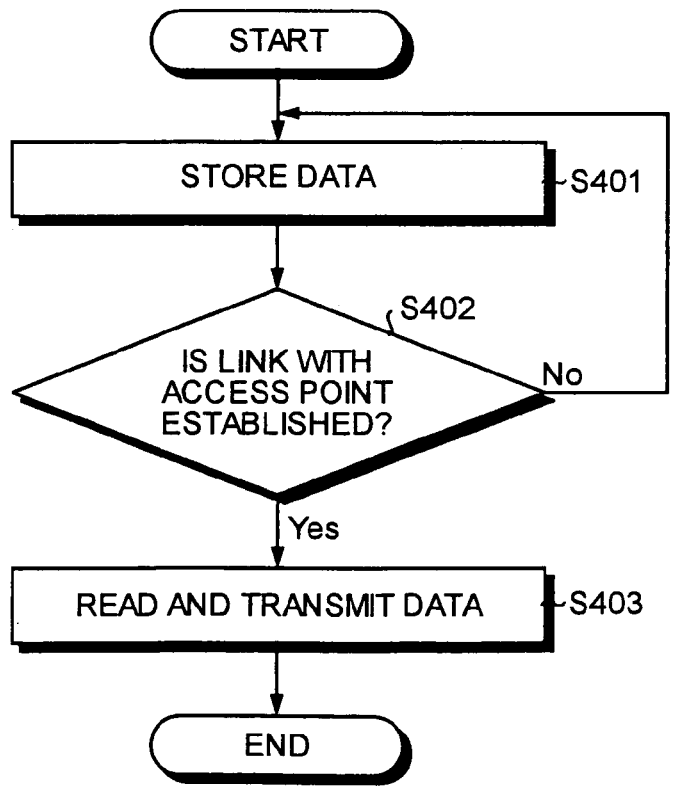
FIG. 4 is a flowchart of a data transmission method according to the first embodiment.

The data transmission method is explained next, with reference to the flowchart shown in FIG. 4. The memory control section 206 of the radio LAN apparatus 200 temporarily stores into the memory 207, data to be transmitted to the access point (step S401). The beacon detecting section 208 detects whether the link with the access point is established (step S402). If the link with access point is established (Yes at step S402), the memory control section 206 reads the data stored in the memory 207, and transmits the data to the access point (step S403). On the other hand, if the link with the access point is not established (No at step S402), the processing control is returned to step S401. Thus, in the first embodiment, the data stored in the memory 207 are read only when the link with the access point is established.

Each access point in the relay station 220 does not transmit a response confirmation signal, for acknowledging data, to the radio LAN apparatus 200. Therefore, transmission throughput does not deteriorate, and data can be transmitted at high rate.

The switching between the radio LAN apparatus 200 and each access point in the relay station 220 is executed by a conventional method.

When the mobile station crosses over communication ranges of different access points of the relay station, the access points are switched. In the configuration of the first embodiment, image data transmission is interrupted until the switching process is completed. When communication between the mobile station and the next access point is resumed, the data stored in the memory 207 of the radio LAN apparatus 200 are transmitted to the host station. As for the data that are received by the host station after the restarting of the communication, although a sequence of the data on the time axis is maintained, there is a possibility that there are intermittent coarse portions in the data and thus, quality of the image is degraded. A second embodiment of the present invention solves this problem.

Figure 5:
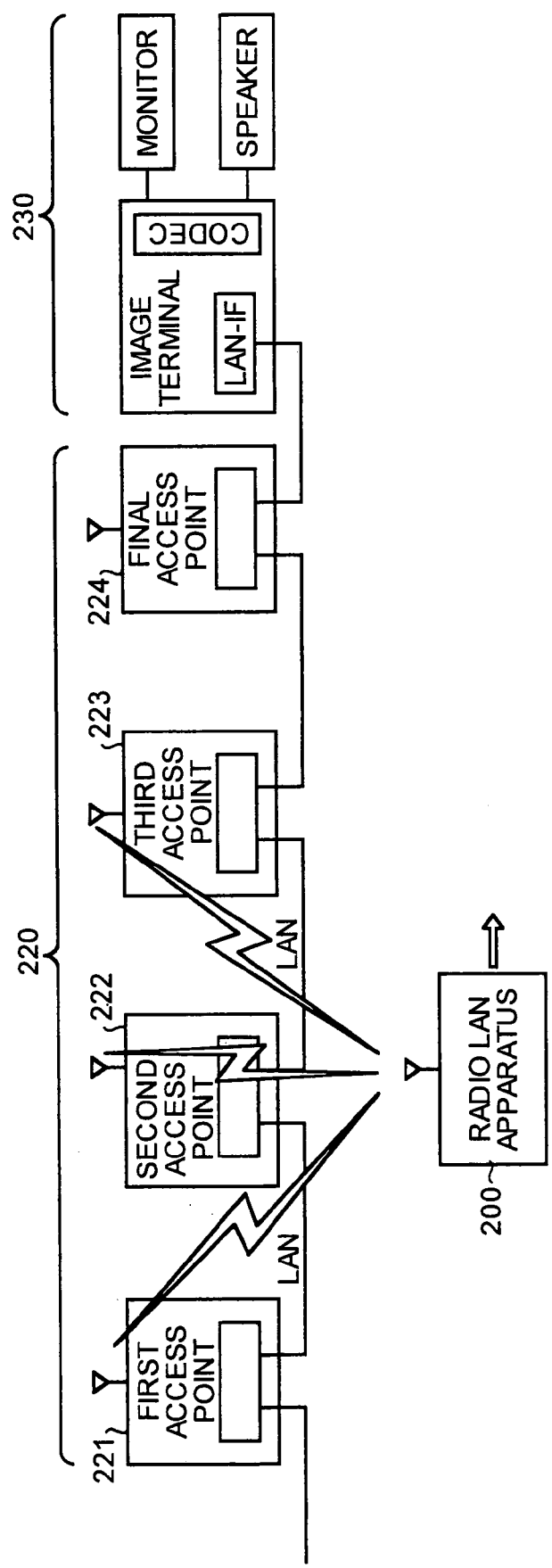
FIG. 5 illustrates a configuration of the radio LAN data transmission system according to a second embodiment.
Figure 6:
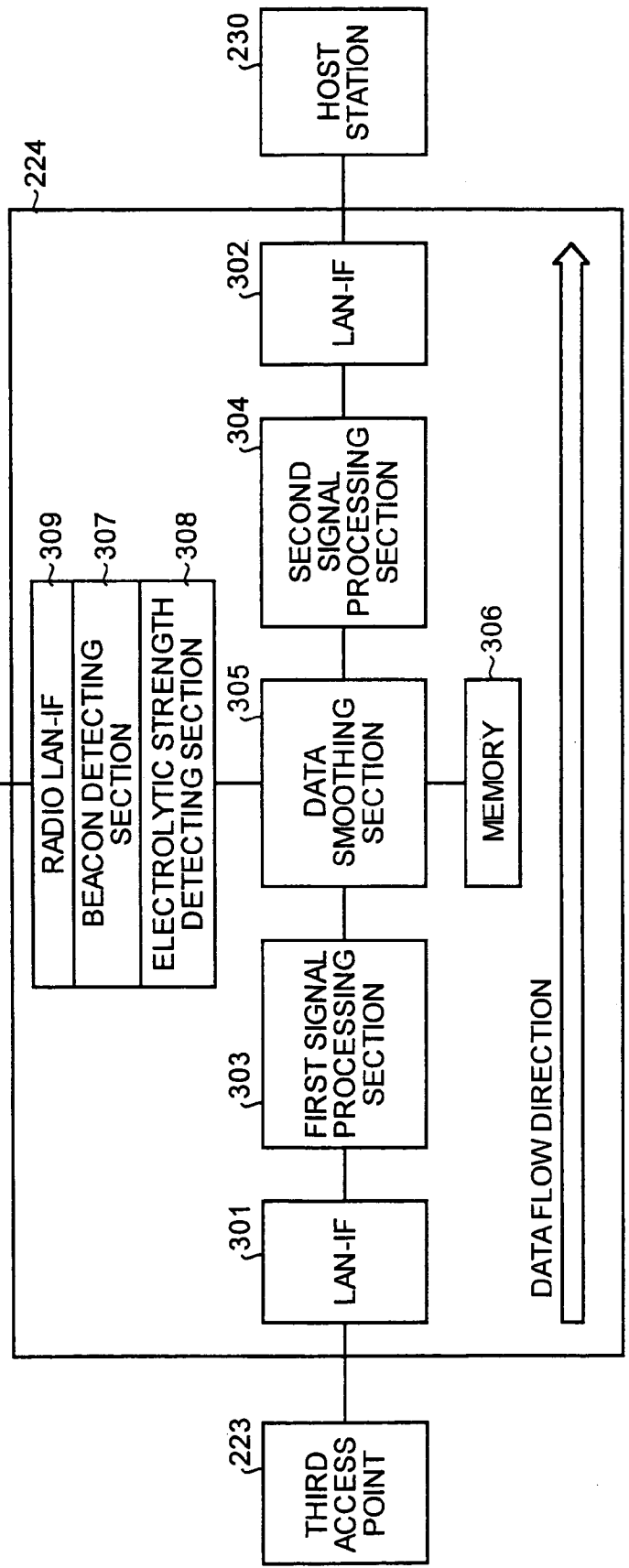
FIG. 6 illustrates a configuration of a final access point of a relay station in the second embodiment.

FIG. 5 illustrates a configuration of a radio LAN data transmission system according to the second embodiment. FIG. 6 illustrates a configuration of a final access point according to the second embodiment. The final access point 224 includes LAN interfaces 301 and 302, a first signal processing section 303, a second signal processing section 304, a data smoothing section 305, a memory 306, a beacon detecting section 307, an electrolytic strength detecting section 308, and a radio LAN interface 309. The components other than the data smoothing section 305 and the memory 306 are similar to those used in the conventional system. Further, the radio LAN apparatus 200 installed in the mobile station is similar to that in the first embodiment.

Figure 7:
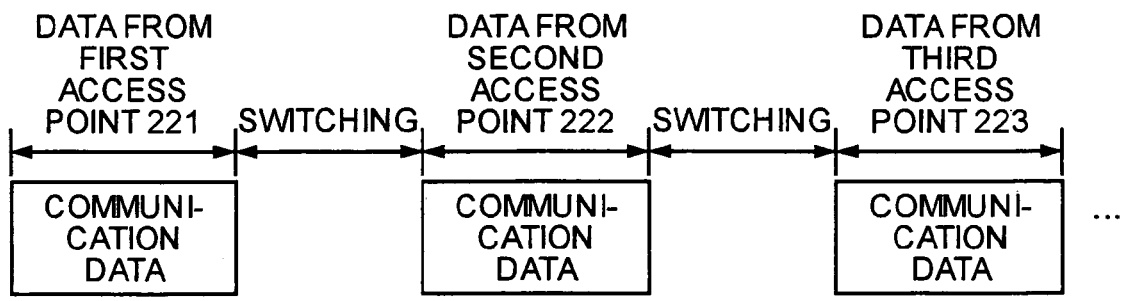
FIG. 7 illustrates a pattern of data acquired by the final access point.

At the final access point 224, the first signal processing section 303 receives data transmitted from an access point via the LAN interface 301. Because the data received by the first signal processing section 303 includes data obtained during switching of the access point, the data received are so-called burst data, which contains intermittent coarse portions (see FIG. 7). The first signal processing section 303 further transmits the data to the data smoothing section 305. The data smoothing section 305 temporarily stores the data into the memory 306, reads the data stored in the memory 306, and transmits the data to the second signal processing section 304. The second signal processing section 304 transmits the data to the host station 230 via the LAN interface 302.

Figure 8:
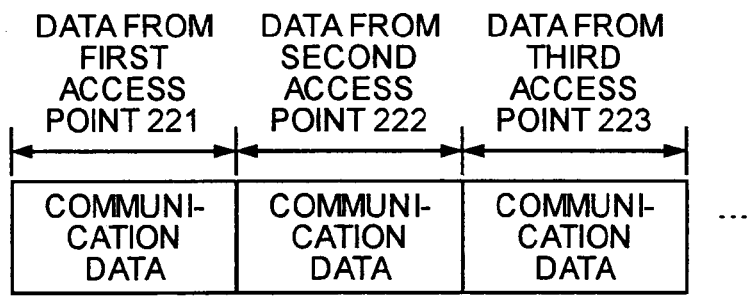
FIG. 8 illustrates a pattern of data output by the final access point.

In the second embodiment, a transmission speed of the data input into the data smoothing section 305 is about 10 megabits per second, but a transmission speed of the data output from the data smoothing section 305 is about 6 megabits per second. With such throughput, the coarse portions between data are eliminated from the data output from the data smoothing section 305, and thus the smoothing of the data can be achieved (see FIG. 8). Thus, data can be transmitted to the host station 230 continuously and without deteriorating real time properties of the image.

The transmission speed of the data input into the data smoothing section 305 and a transmission speed of the data output from the data smoothing section 305 are not limited to the above values. In the data smoothing section 305, the transmission speed of the output data should be less than that of the input data, so that the smoothing of the data can be achieved.

Figure 9:
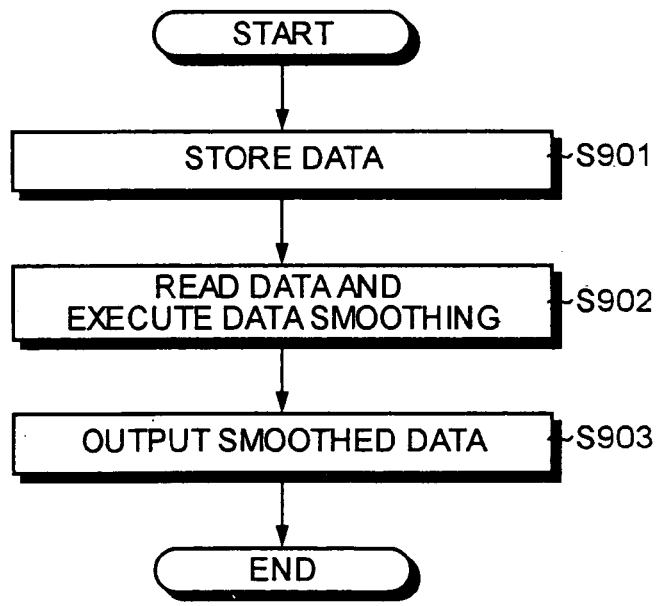
FIG. 9 is a flowchart of a data transmission method according to the second embodiment.

FIG. 9 is a flowchart of the data transmission method according to the second embodiment. The data acquired by the data smoothing section 305 at the final access point 224 are temporarily stored in the memory 306 (step S901). The data smoothing section 305 reads the data stored in the memory 306 successively, and performs the data smoothing process-on the data read (step S902). The smoothed data are output (step S903). In the second embodiment, transmitted data are not smoothed immediately after the data is received. The process of smoothing is carried out after temporarily storing the data in the memory. As a result, the continuity of the output data is maintained.

Figure 10:
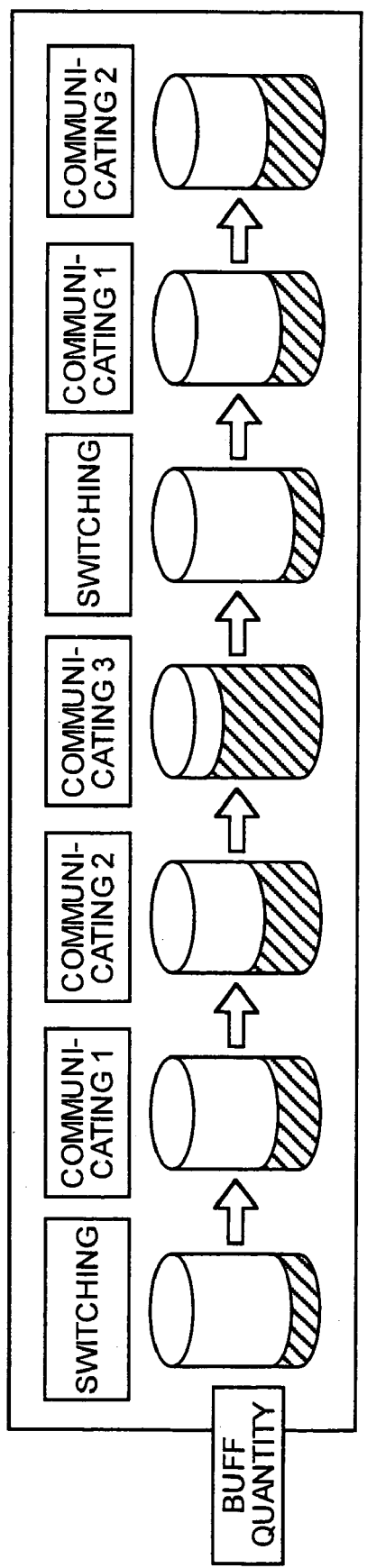
FIG. 10 illustrates views of memory usage in the final access point.

During the operation for switching the access point, as shown in FIG. 10, data are not stored in the memory 306, but data are read from the memory 306, so that a data storage quantity in the memory 306 becomes minimum. On the other hand, after the completion of the operation for switching into next access point, not only the data stored during the switching but also data transmitted thereafter, are stored in the memory 306. Volume of data written into memory is larger than volume of data read. As a result, the data storage quantity in the memory 306 increases.

Figure 11:
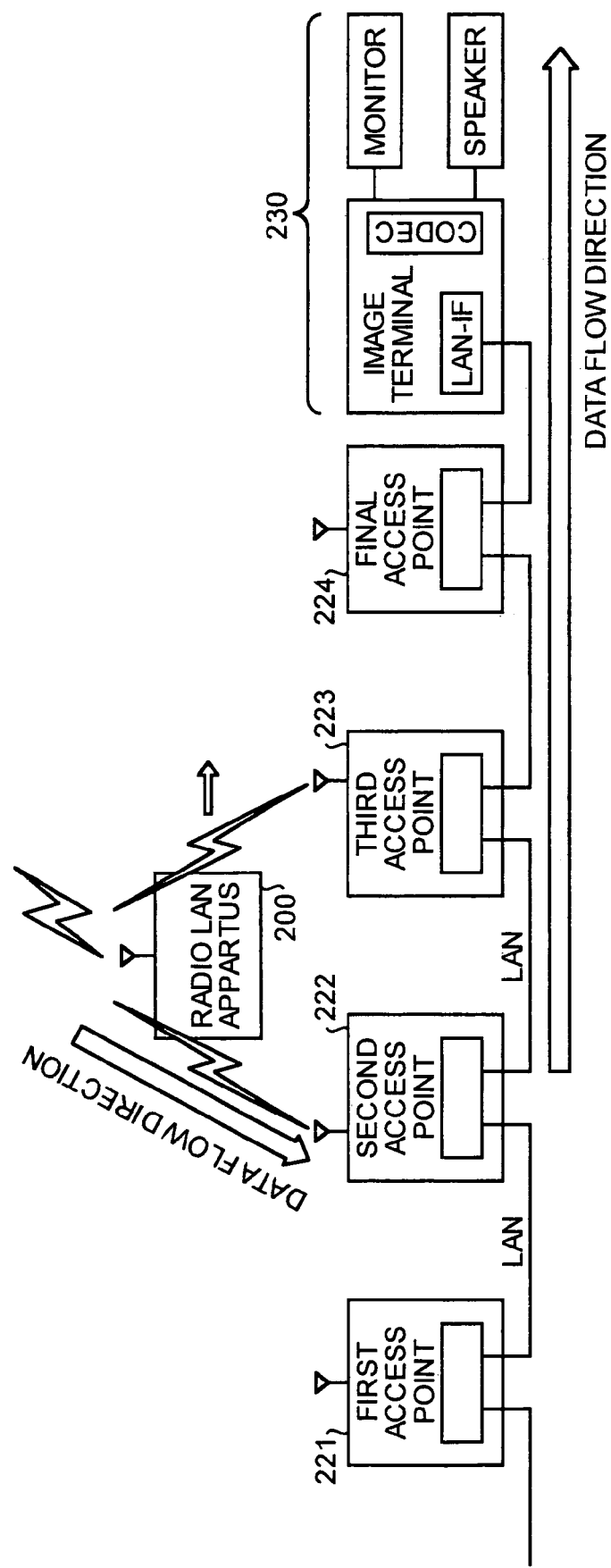
FIG. 11 illustrates a configuration of the radio LAN data transmission system according to a third embodiment.
Figure 12:
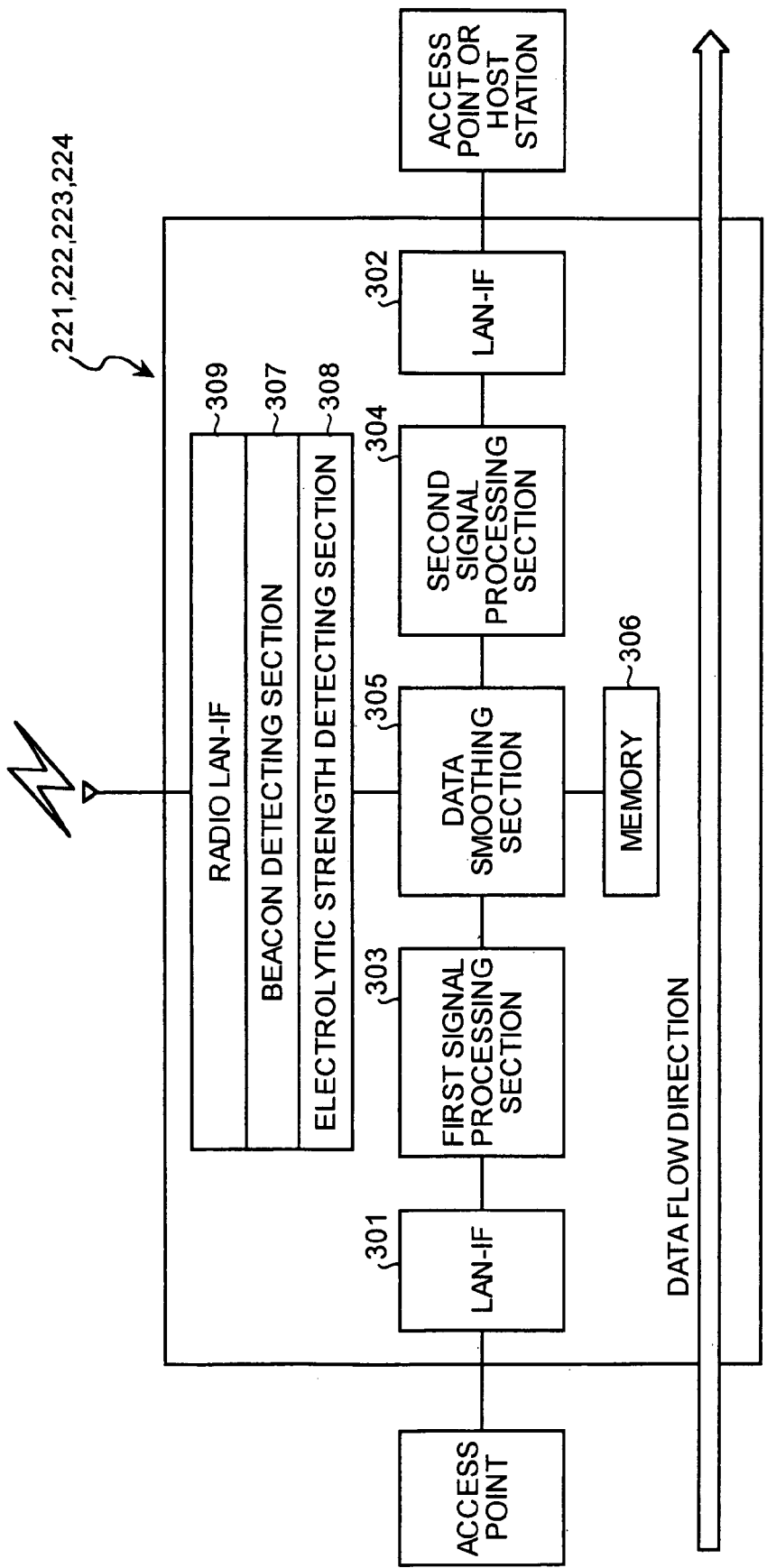
FIG. 12 illustrates configuration of each access point of a relay station in the third embodiment.
Figure 13:
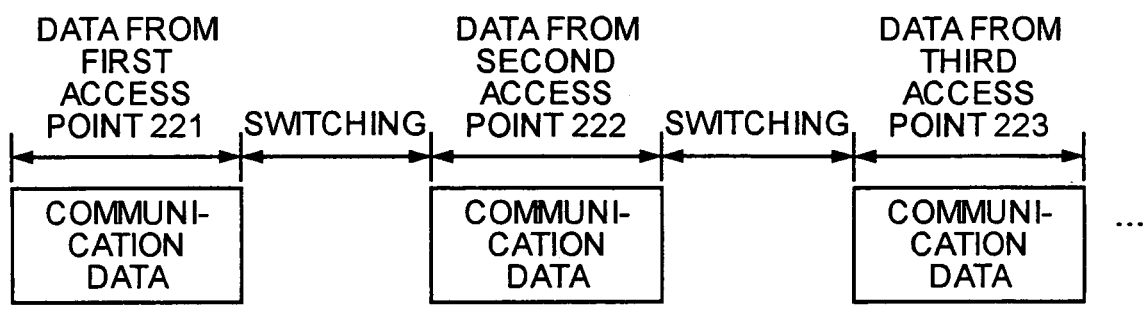
FIG. 13 illustrates a pattern of data acquired by an access point.
Figure 14:
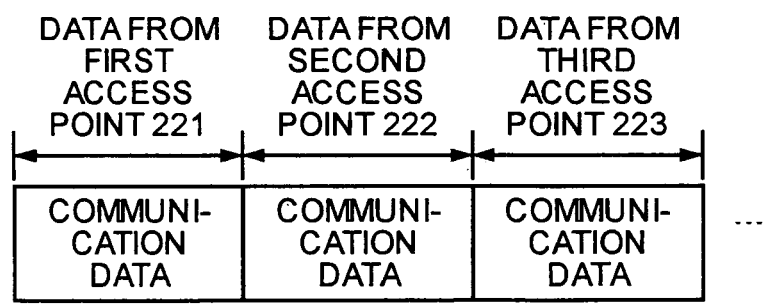
FIG. 14 illustrates a pattern of data output by an access point.
Figure 15:
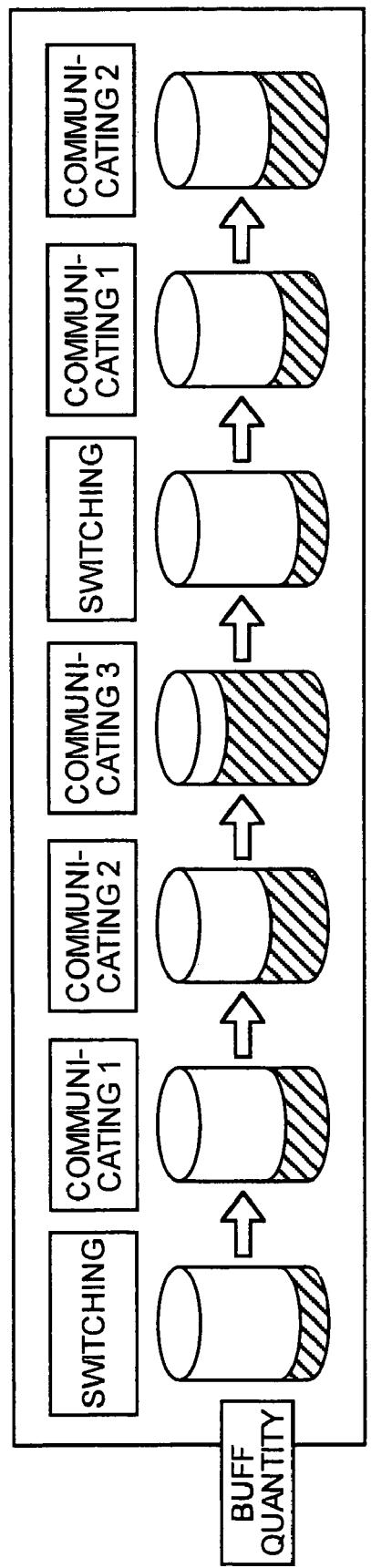
FIG. 15 illustrates views of memory usage in an access point.

FIG. 11 illustrates configuration of a system according to a third embodiment. FIG. 12 illustrates configuration of each access point in a relay station according to the third embodiment. In the second embodiment, the data smoothing section 305 and the memory 306 are provided only to the final access point 224 in the relay station 220, and coarse portions between data are eliminated by the smoothing of data. On the contrary, in the third embodiment, the data smoothing section 305 and the memory 306 are provided in all the access points in the relay station 220. Thus, all the access points have identical configuration. Accordingly, burst data shown in FIG. 13 can be smoothed to obtain smoothed data as shown in FIG. 14 in all the access points, and the components of the relay station 220 can be simplified. FIG. 15 illustrates views of usage of memory 306.

Suppose that data are transmitted between the radio LAN apparatus 200 of the mobile station and the second access point 222 of the relay station 220. When the mobile station moves to the communication range of the third access point 223, data transmission from the radio LAN apparatus 200 requires switching to the third access point 223. During the switching process, untransmitted data stored at the second access point 222 are transmitted to the third access point 223. When the time required for establishing the communication between the radio LAN apparatus 200 and the third access point 223 is shorter than an assumed time, the third access point 223 receives data from the radio LAN apparatus 200 before receiving the data from the second access point 222. In this case, the data received from the radio LAN apparatus 200 are transmitted to the final access point 224 before the data from the second access point 222. Thus, data is not transmitted in the correct sequence. A fourth embodiment of the present invention eliminates such a defect.

Figure 16:
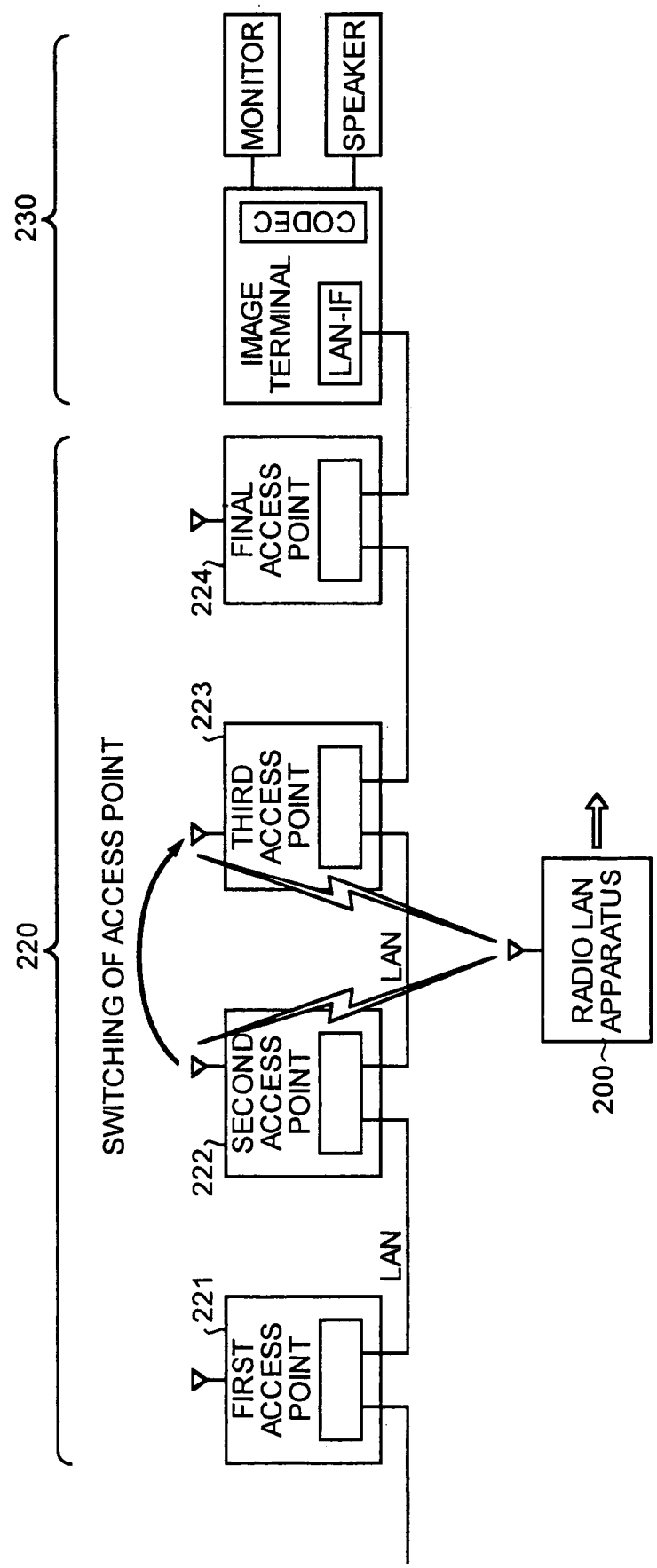
FIG. 16 illustrates a configuration of the radio LAN data transmission system according to a fourth embodiment.
Figure 17:
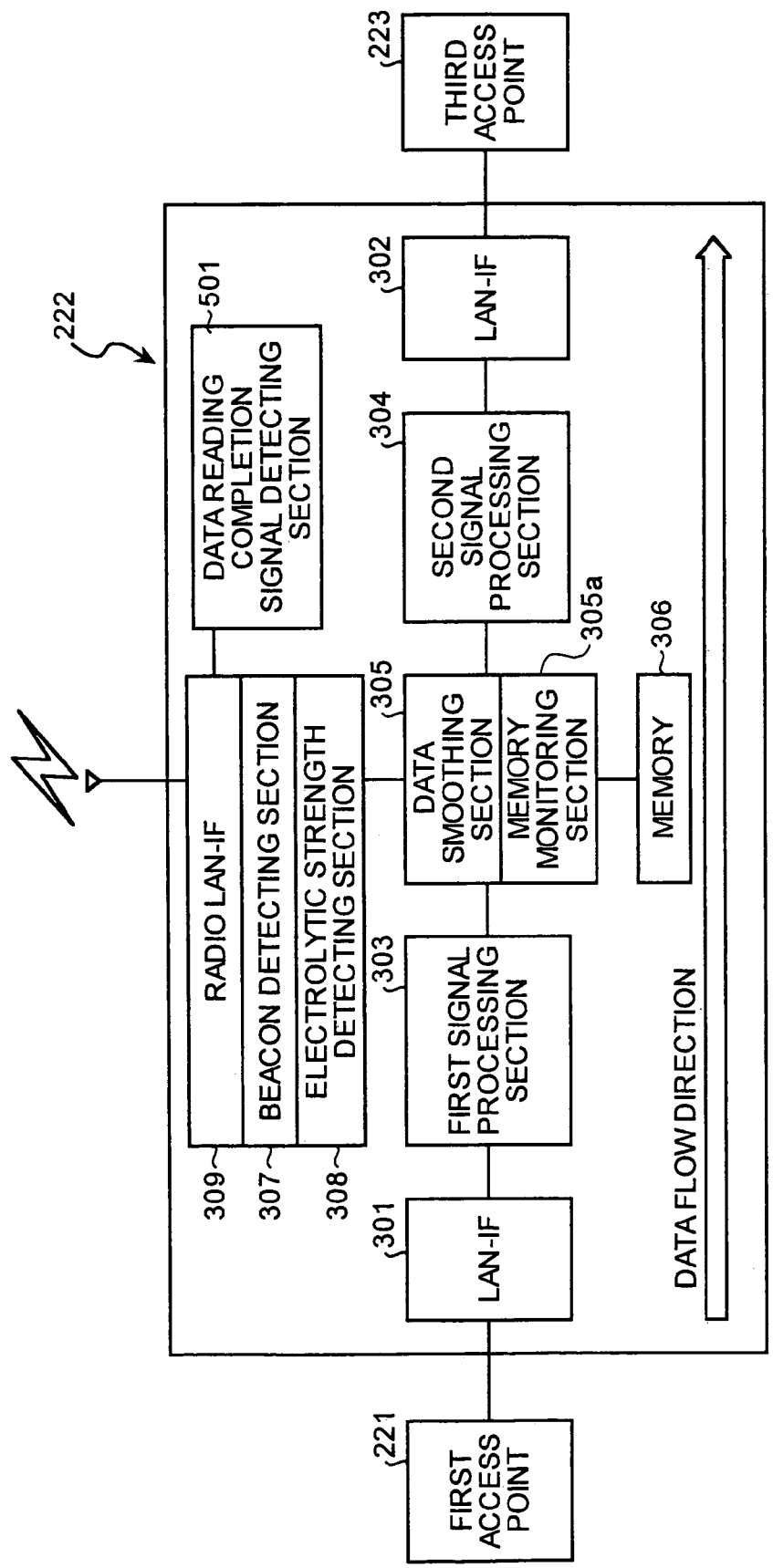
FIG. 17 illustrates configuration of an access point of a relay station in the fourth embodiment.

FIG. 16 illustrates a configuration of a radio LAN data transmission system according to the fourth embodiment. FIG. 17 illustrates a configuration of an access point according to the fourth embodiment. A memory monitoring section 305a is provided to the data smoothing section 305 of each access point. The memory monitoring section 305a monitors a residual data quantity of the memory 306, and delivers a data reading completion signal to another access point when the residual data quantity in the memory 306 becomes 0. Further, there is a data reading completion signal detecting section 501 that detects the data reading completion signal transmitted by another access point. The other parts of the configuration are similar to those in the third embodiment.

Figure 18:
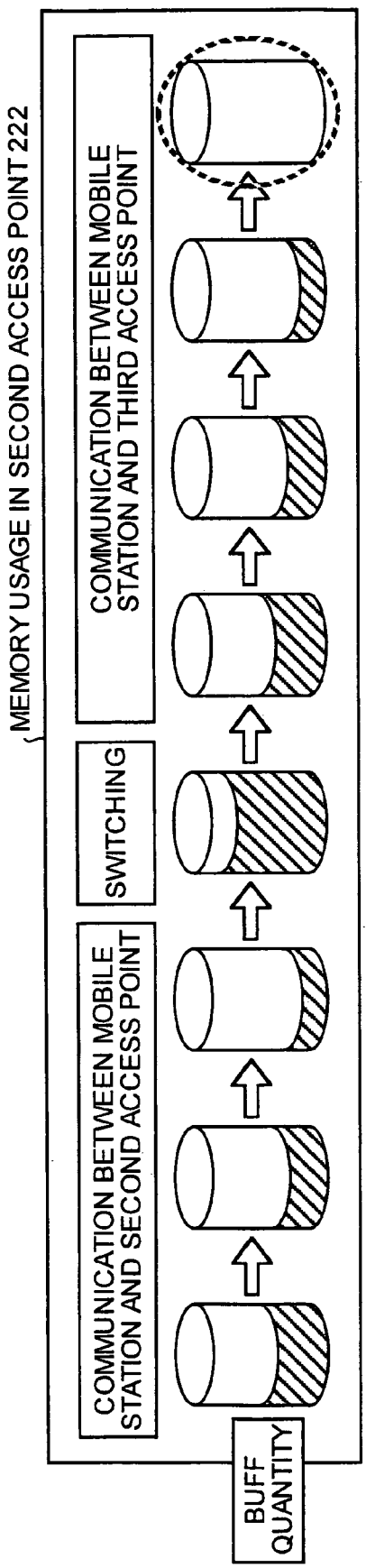
FIG. 18 illustrates views of memory usage in a second access point.
Figure 19:
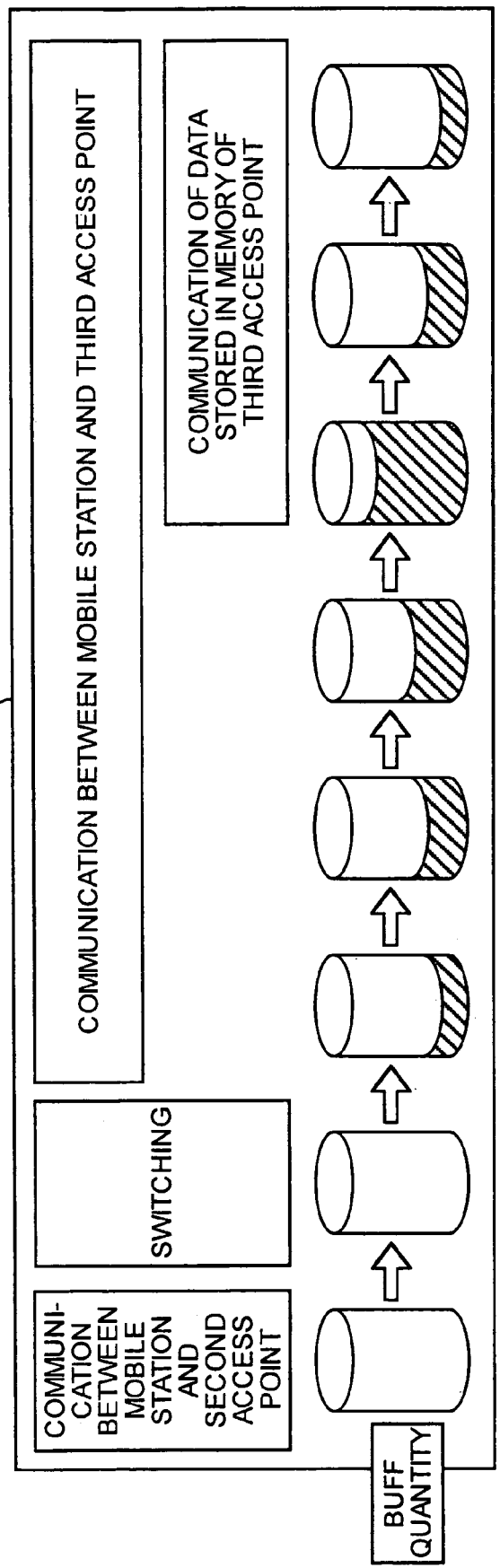
FIG. 19 illustrates views of memory usage in a third access point.

In the fourth embodiment, during the switching process, the memory monitoring section 305a monitors the residual data quantity in the memory 306. When a quantity of data stored in the memory 306 becomes 0 (see FIG. 18), the memory monitoring section 305a transmits the data reading completion signal to that access point which establishes communication with the radio LAN apparatus 200. Then the access point, which is connected with the radio LAN apparatus 2001, continues transmission of the data to a next access point (see FIG. 19). Thus, the sequence of data transmission can be maintained.

Figure 20:
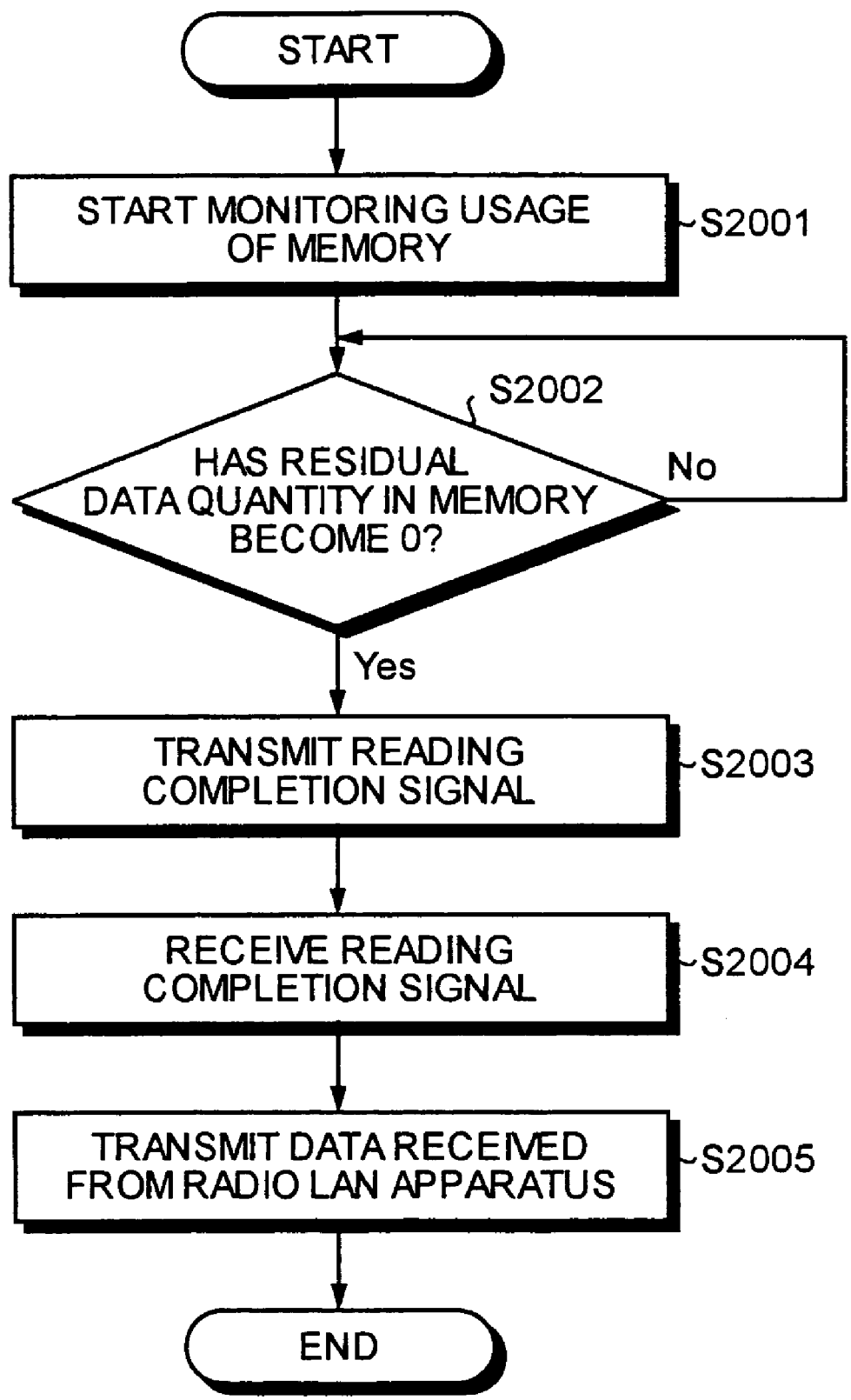
FIG. 20 is a flowchart of a data transmission method according to the fourth embodiment.

FIG. 20 is a flowchart of the data transmission method according to the fourth embodiment. When storage of the data into memory 306 begins, the memory monitoring section 305a of each access point starts monitoring the residual data in the memory (step S2001). The memory monitoring section 305a detects whether the residual data quantity in the memory 306 has become 0 (step S2002). If the residual data quantity in the memory 306 becomes 0 (Yes at step S2002), the memory monitoring section 305a transmits the data reading completion signal to another access point (step S2003). If the residual data quantity in the memory 306 is not 0 (No at step S2002), the sequence returns to step S2002, so that the process is repeated. When the data reading completion signal is received (step S2004), the stored data is transmitted to the next access point (step S2005).

The data reading completion signal may be transmitted or received by the access points via the radio LAN interface 309 provided in the access point, or via a cable LAN.

Communication load increases because the data reading completion signal is transmitted every time the transmission of data is complete. Moreover, if data transmission increases, the efficiency of the communication is inhibited. A fifth embodiment of the present invention avoids such a problem. In the fifth embodiment, the data reading completion signal is not transmitted or received between the access points. Instead, a packet number written into a header section of the transmitted data is monitored. The packet numbers of the respective data are compared with each other so as to ensure that the data transmission order is maintained.

Figure 21:
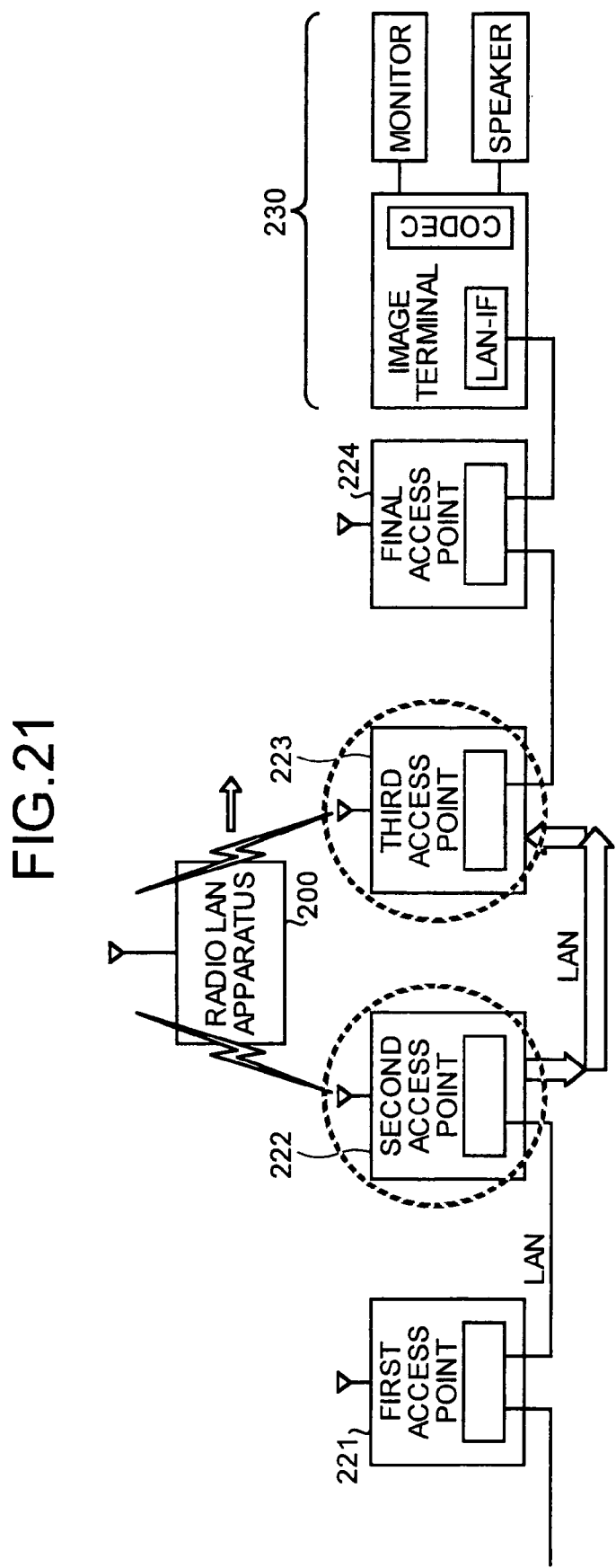
FIG. 21 illustrates a configuration of the radio LAN data transmission system according to a fifth embodiment.
Figure 22:
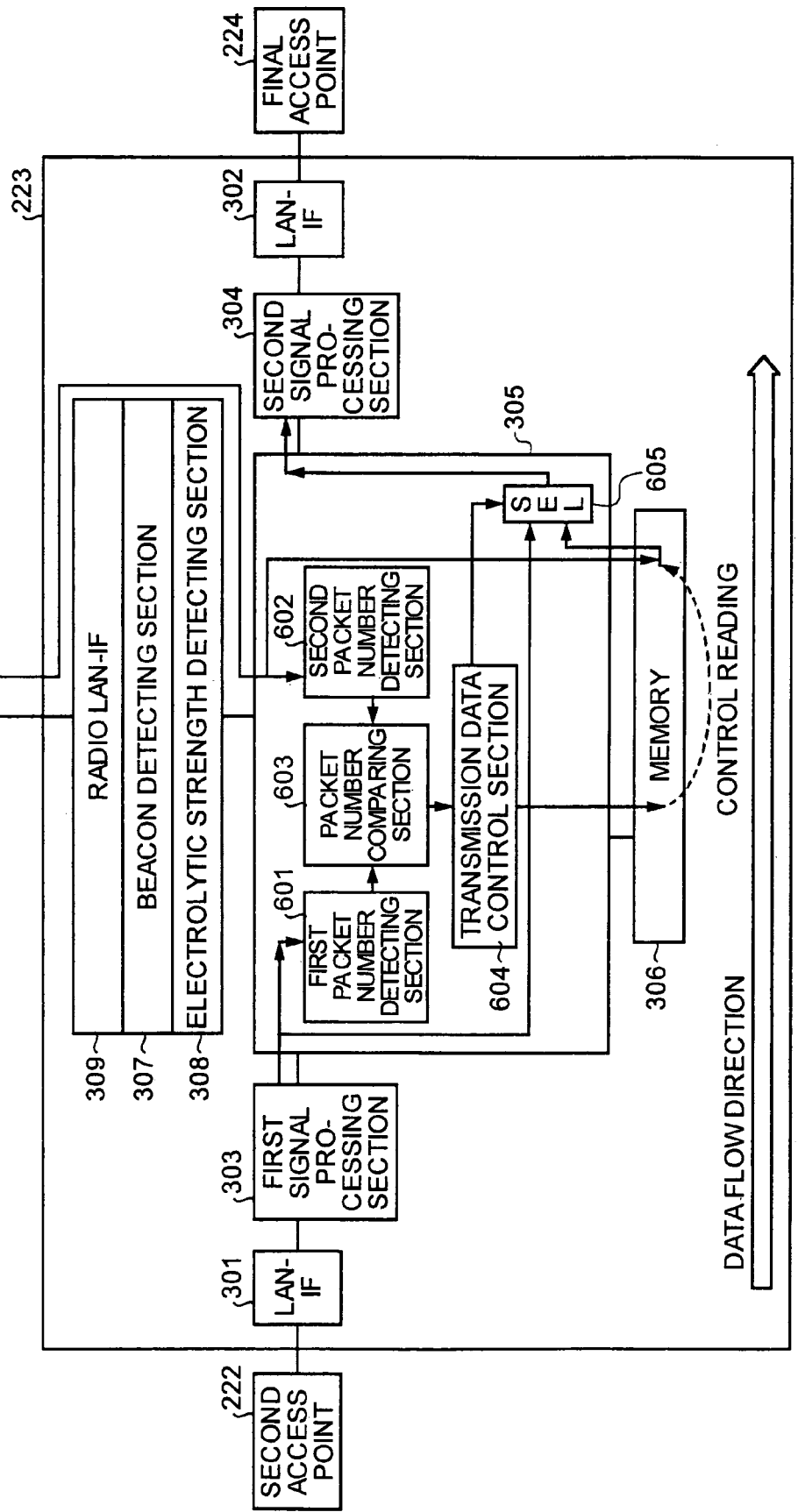
FIG. 22 illustrates a configuration of an access point of a relay station in the fifth embodiment.

FIG. 21 illustrates a configuration of a radio LAN data transmission system according to the fifth embodiment. FIG. 22 illustrates a configuration of an access point in a relay station in the fifth embodiment. A first packet number detecting section 601, a second packet number detecting section 602, a packet number comparing section 603, a transmission data control section 604, and a selector 605 are further provided into the data smoothing section 305 of the apparatus installed in each access point explained in the third embodiment.

Figure 23:
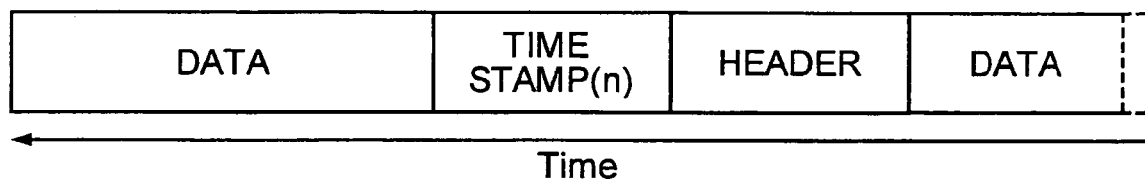
FIG. 23 illustrates a format of transmission data.

In the fifth embodiment, the first packet number detecting section 601 detects a packet number written into a header section of the data (see FIG. 23) received from another access point. Meanwhile, the second packet number detecting section 602 detects a packet number written into a header section of data transmitted by the radio LAN apparatus 200. The packet number comparing section 603 compares these two packet numbers. The transmission data control section 604 controls the memory 306 and the selector 605 based on the result of comparison, in order to ensure that the data are transmitted to the next access point in the correct sequence. Moreover, the communication load can be reduced, thereby increasing the efficiency of communication.

Figure 24:
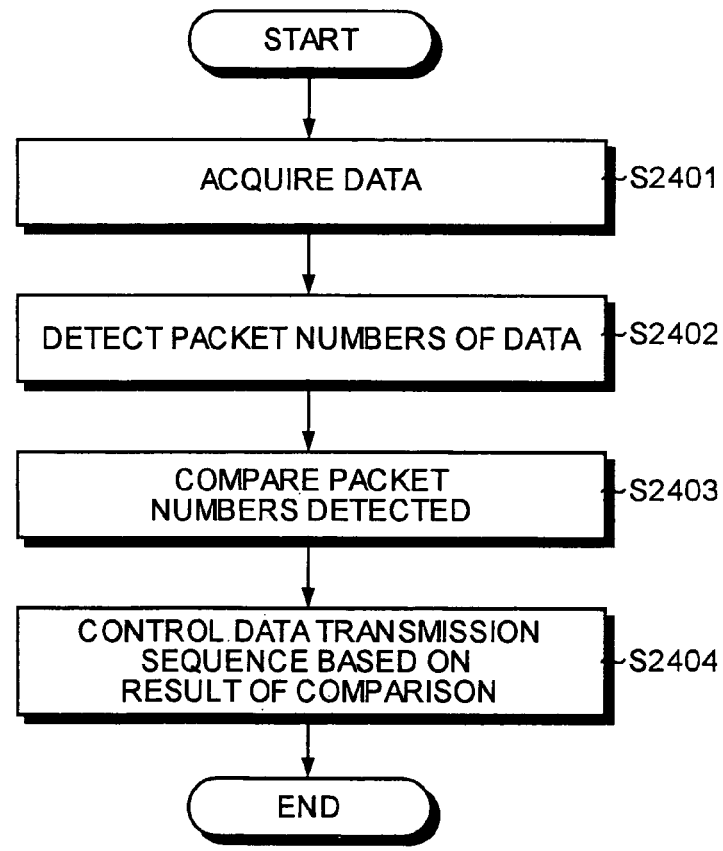
FIG. 24 is a flowchart of a data transmission method according to the fifth embodiment.

FIG. 24 is a flowchart of a data transmission method according to the fifth embodiment. When an access point receives data (step S2401), the first packet number detecting section 601 and the second packet number detecting section 602 detect the packet numbers of the transmitted data and the acquired data (step S2402). The packet number comparing section 603 compares the packet numbers detected (step S2403). The transmission data control section 604 controls the sequence of writing or reading data in the memory 306 based on the result of the comparison (step S2404).

The data to be transmitted also contains time stamps. Therefore, instead of comparing the packet numbers, time stamps may be compared. In this case, a first time stamp detecting section, a second time stamp detecting section, and a time stamp comparing section may be provided in FIG. 22, instead of the first packet number detecting section 601, the second packet number detecting section 602, and the packet number comparing section 603, respectively.

Just as data is transmitted from the mobile station to the host station, data can also be transmitted from the host station to the mobile station via the relay station. When the host station 230 transmits data via the relay station 220 to the radio LAN apparatus 200 in the mobile station, the data may contain intermittent coarse portions. Therefore, there is a possibility that the continuity of data transmission may be inhibited. A sixth embodiment of the present invention avoids such a defect.

Figure 25:
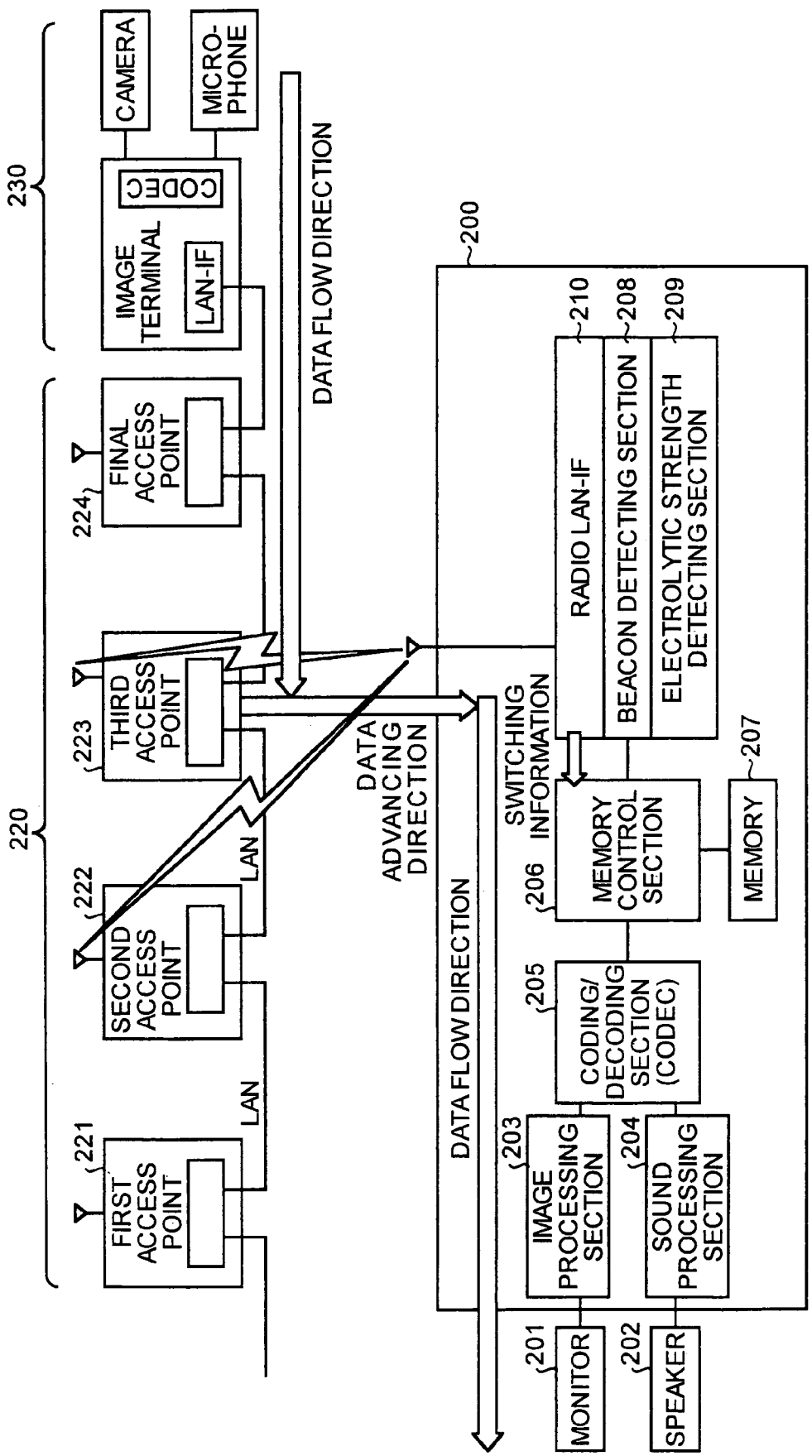
FIG. 25 is a detailed configuration of a radio LAN data transmission system according to a sixth embodiment.
Figure 26:
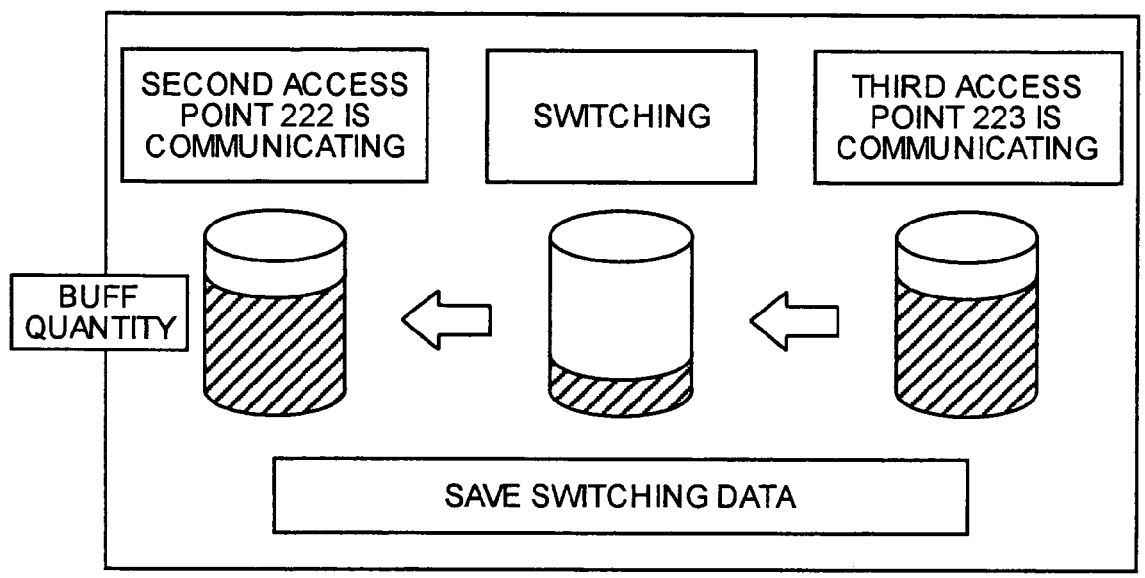
FIG. 26 illustrates views of memory usage in a radio LAN apparatus.

FIG. 25 is a detailed configuration of the radio LAN apparatus installed according to the sixth embodiment. The basic configuration is similar to that in the first embodiment shown in FIG. 1, but the configuration in the sixth embodiment is such that data can be transmitted to two directions. Data can also flow in a direction opposite to that in the first embodiment. Further, in the first embodiment, the communication is temporarily interrupted at the time of the switching between access points. However, in the sixth embodiment, data transmitted from an access point are temporarily stored in the memory 207. The memory control section 206 reads the data stored in the memory 207 successively so as to transmit them to the coding/decoding section 205. As a result, the data transmission is not disturbed even during the switching of the access points, and the continuity of data transmission is secured. FIG. 26 illustrates views of usage of memory 207.

Figure 27:
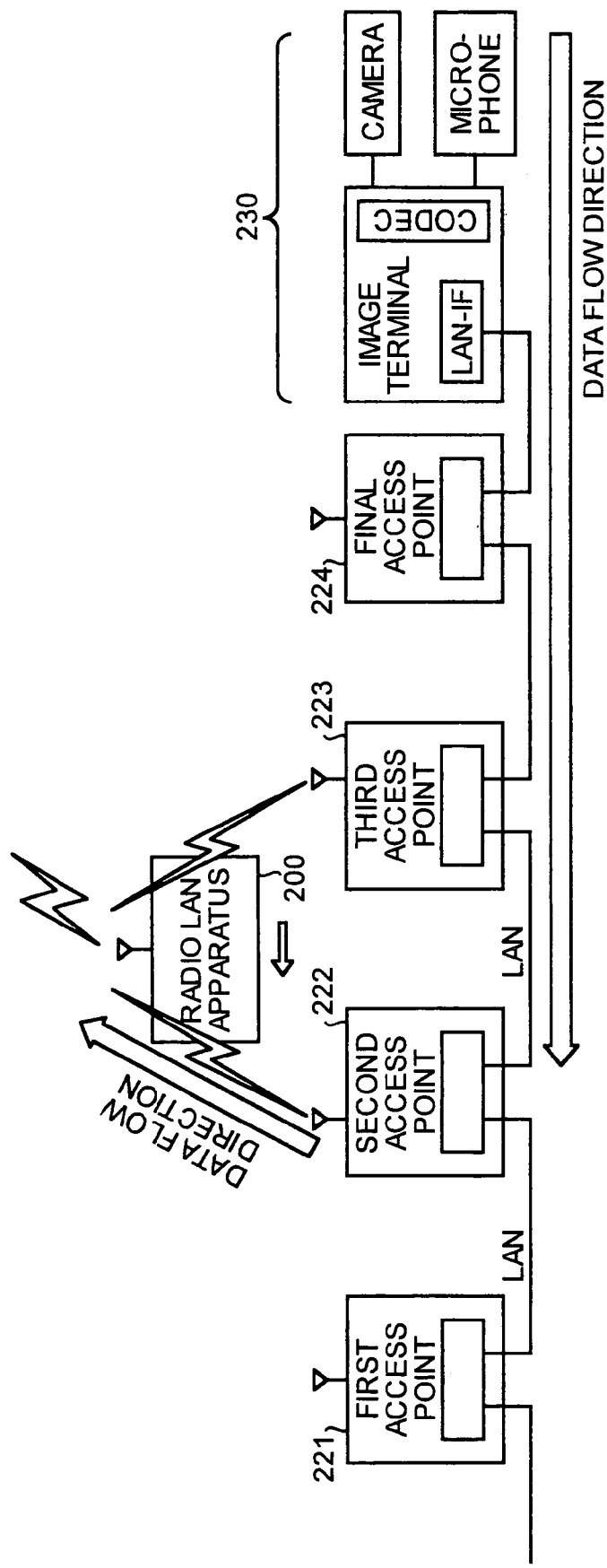
FIG. 27 illustrates a configuration of a radio LAN data transmission system according to a seventh embodiment.
Figure 28:
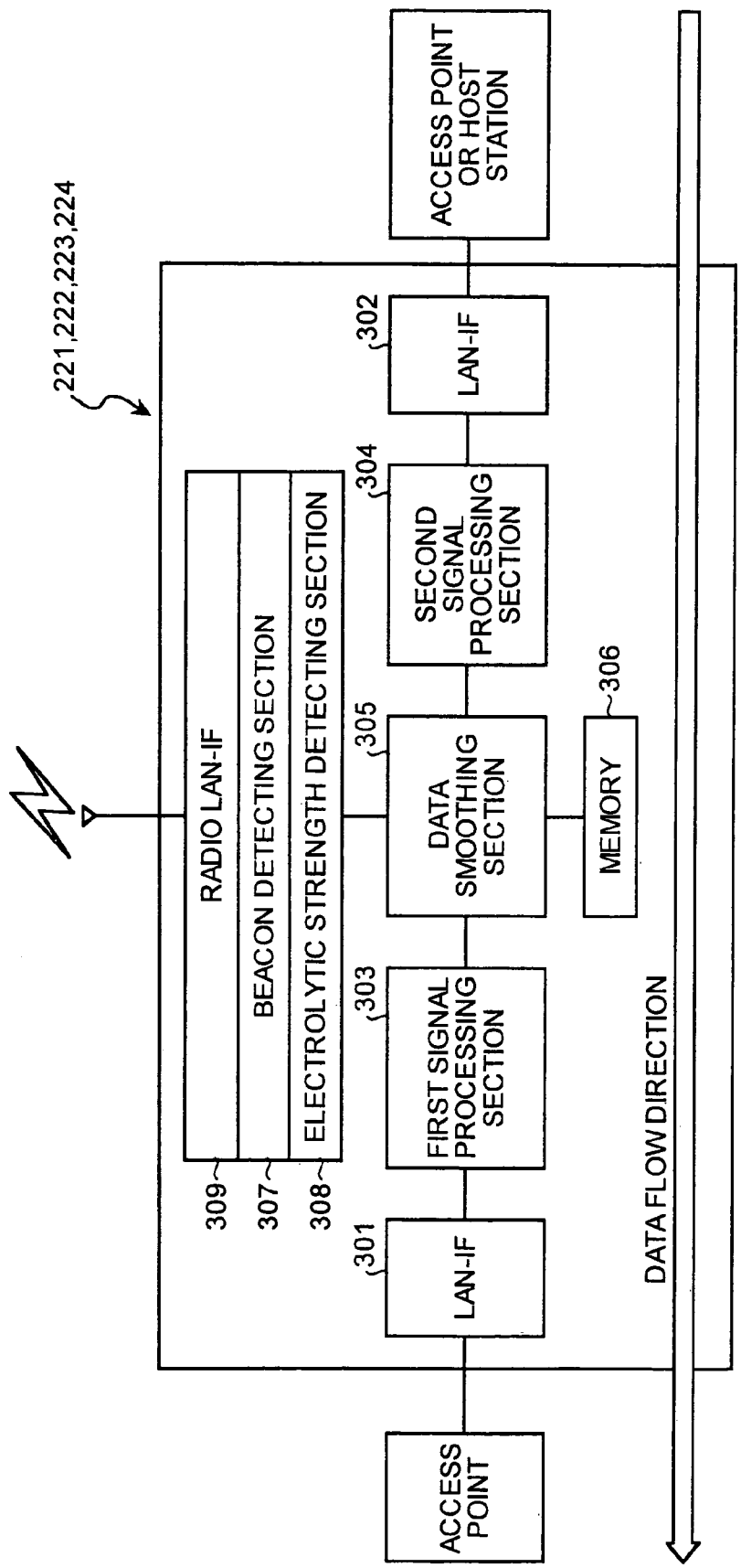
FIG. 28 illustrates a configuration of each access point of a relay station according to the seventh embodiment.
Figure 29:
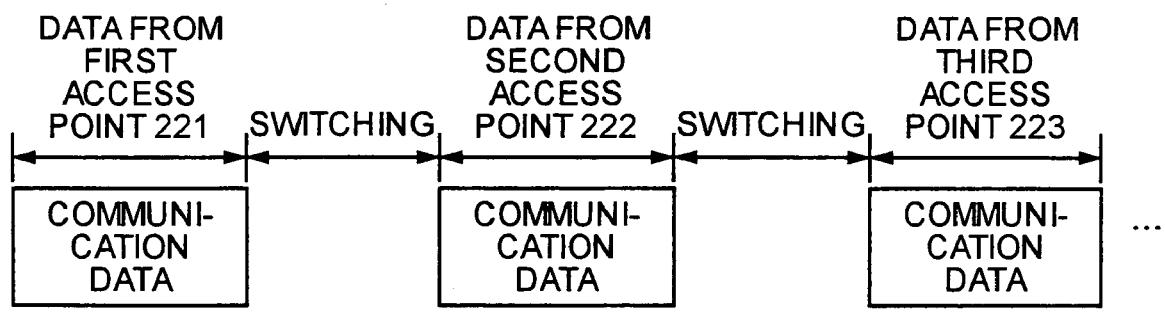
FIG. 29 illustrates a pattern of data acquired by an access point.
Figure 30:
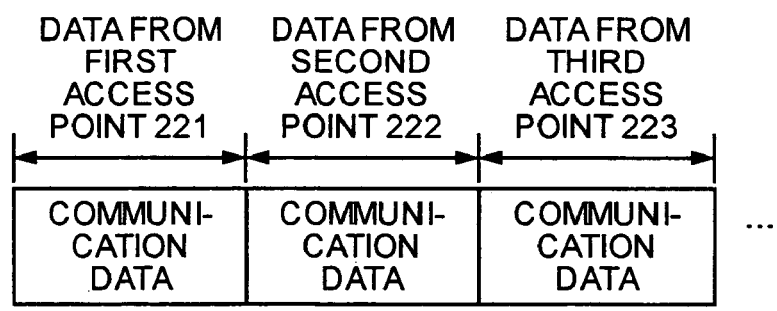
FIG. 30 illustrates a pattern of data output by an access point.
Figure 31:
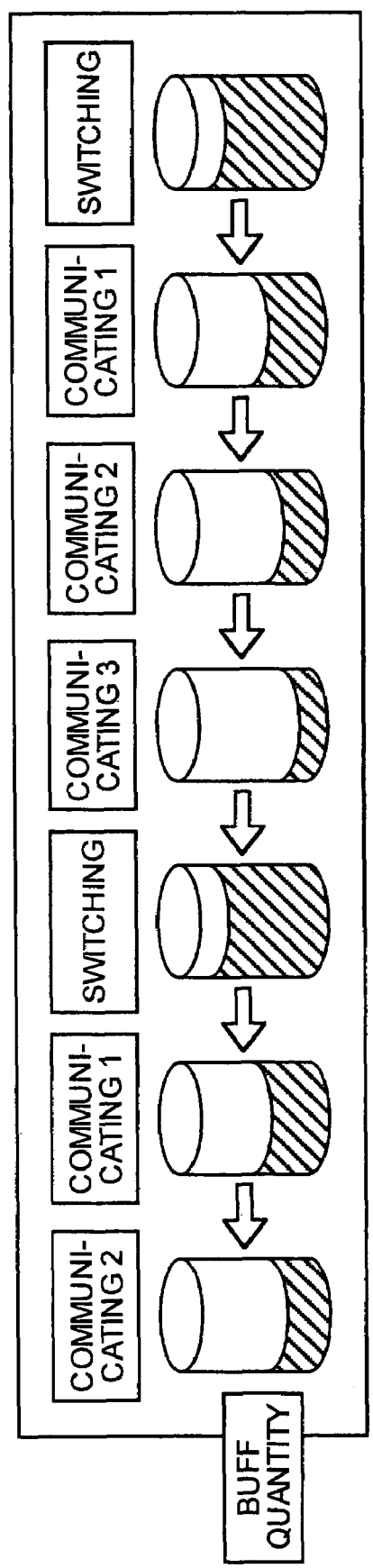
FIG. 31 illustrates views of memory usage in each access point.

FIG. 27 illustrates a configuration of a radio LAN data transmission system according to a seventh embodiment. FIG. 28 illustrates a configuration of each access point according to the seventh embodiment. The basic configuration is similar to that in the third embodiment, but data can be transmitted in two directions. Similar to the sixth embodiment, it is assumed that the data are transmitted from the host station 230 via the relay station to the radio LAN apparatus 200 in the mobile station. Data flows in a direction opposite to that in the third embodiment. That is, in the apparatus installed at each access point, after transmission data (see FIG. 29) are temporarily stored in the memory 306, smoothed data (see FIG. 30) are transmitted to that access point with which a communication link with the radio LAN apparatus 200 is established, or directly to the radio LAN apparatus 200. As a result, even at the time of the switching of the access points, the continuity of data transmission can be secured without disturbing the data transmission. The seventh embodiment explains the switching from the third access point 223 into the second access point 222. FIG. 31 illustrates views of usage of memory 306 at that time.

According to the present invention, the bandwidth is used efficiently so that the data transmission efficiency can be improved. Therefore, even when transmission is executed near a bandwidth limit, or when a transmission environment of very low bandwidth can be secured the continuity of the data transmission is secured and the high quality of data transmission can be realized.

The radio LAN data transmission method can be realized by executing a program on a computer such as a personal computer or a workstation. This program may be recorded in a computer readable recording medium such as a hard disc, a flexible disc, a CD-ROM, a magneto optical (MO), or a digital versatile disk (DVD). The computer can execute the program after reading it from the recording medium. Further, the program may be a transmission medium, which can be distributed via a network such as the Internet.

The radio LAN data transmission system according to the present invention is useful for communication between the mobile station and the relay station via the radio LAN, and is particularly suitable when continuous transmission of real time data is required.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A radio LAN data transmission system, comprising:
a host station, a relay station having a plurality of access points, and a mobile station having a radio LAN apparatus that transmits data to and receives data from the host station via the relay station, wherein the radio LAN apparatus includes
a memory unit that temporarily stores transmission data that is data to be transmitted to an access point; and
a memory control unit that provides a control to store the transmission data in the memory unit at the time of switching from one access point to another access point, and to transmit the transmission data to the another access point when the radio LAN apparatus establishes a communication link with the another access point;
wherein a desired one of the access points includes a storage unit that temporarily stores input data; and a data smoothing unit that smoothes the input data to generate output data while the input data is being read from the storage unit and each access point includes:
a memory monitoring unit that outputs a completion signal to an access point other than the one access point, when reading of all the data stored in the storage unit has finished; and
a completion signal detecting unit that detects a completion signal output from a memory monitoring unit of an access point other than the one access point.

2. The radio LAN data transmission system according to claim 1, wherein the data smoothing unit outputs the output data at a transmission speed that is different from a transmission speed at which the input data is read.

3. The radio LAN data transmission system according to claim 2, wherein the data smoothing unit outputs the output data at a transmission speed that is lower than a transmission speed at which the input data is read.

4. The radio LAN data transmission system according to claim 1, wherein a desired one of the access point includes:
a packet number detecting unit that detects a first packet number that is a packet number of data transmitted from an access point other than the one access point and a second packet number that is a packet number of data transmitted from the radio LAN apparatus;
a packet number comparing unit that compares the first packet number and the second packet number, and generates a packet number result; and
a transmission data control unit that controls a sequence of transmitting the transmission data, based on the packet number result.

5. The radio LAN data transmission system according to claim 1, wherein a desired one of the access point includes:
a time stamp detecting unit that detects a first time stamp that is a time stamp of data transmitted from an access point other than the predetermined access point and a second time stamp that is a time stamp of data transmitted from the radio LAN apparatus;
a time stamp comparing unit that compares the first stamp and the second time stamp, and generates a time stamp result; and
a transmission data control unit that controls a sequence of transmitting the transmission data, based on the time stamp result.

6. A radio LAN data transmission system, comprising:
a host station, a relay station having a plurality of access points, and a mobile station having a radio LAN apparatus that transmits data to and receives data from the host station via the relay station, wherein the radio LAN apparatus includes
a memory unit that temporarily stores transmission data that is data to be transmitted to an access point; and
a memory control unit that provides a control to store the transmission data in the memory unit at the time of switching from one access point to another access point, and to transmit the transmission data to the another access point when the radio LAN apparatus establishes a communication link with the another access point;
wherein each access point includes:
a storage unit that temporarily stores input data;
a data smoothing unit that smoothes the input data to generate output data while the input data is being read from the storage unit;
a memory monitoring unit that outputs a completion signal to an access point other than the one access point, when reading of all the data stored in the storage unit has finished; and
a completion signal detecting unit that detects a completion signal output from a memory monitoring unit of an access point other than the one access point.

7. The radio LAN data transmission system according to claim 6, wherein the data smoothing unit outputs the output data at a transmission speed that is different from a transmission speed at which the input data is read.

8. The radio LAN data transmission system according to claim 7, wherein the data smoothing unit outputs the output data at a transmission speed that is lower than a transmission speed at which the input data is read.

9. The radio LAN data transmission system according to claim 6, wherein a desired one of the access point includes:
a packet number detecting unit that detects a first packet number that is a packet number of data transmitted from an access point other than the one access point and a second packet number that is a packet number of data transmitted from the radio LAN apparatus;
a packet number comparing unit that compares the first packet number and the second packet number, and generates a packet number result; and
a transmission data control unit that controls a sequence of transmitting the transmission data, based on the packet number result.

10. The radio LAN data transmission system according to claim 6, wherein a desired one of the access point includes:
a time stamp detecting unit that detects a first time stamp that is a time stamp of data transmitted from an access point other than the predetermined access point and a second time stamp that is a time stamp of data transmitted from the radio LAN apparatus;
a time stamp comparing unit that compares the first stamp and the second time stamp, and generates a time stamp result; and
a transmission data control unit that controls a sequence of transmitting the transmission data, based on the time stamp result.

11. A radio LAN data transmission method of transmitting data between a mobile station having a radio LAN apparatus and a host station, via a relay station having a plurality of access points, comprising:
- temporarily storing transmission data in the radio LAN apparatus;
- detecting whether a link between the radio LAN apparatus and any one of the access points is established;
- reading the transmission data stored when it is detected at the detecting that a link between the radio LAN apparatus and any one of the access points has been established
- temporarily storing data acquired by the access point in the access point; and
- reading the data stored and then smoothing the data;
- detecting an amount of data left unread in the access point;
- generating a reading completion signal when it is detected at the detecting that the amount is zero; and
- starting the transmission of the data, from the access point that receives the reading completion signal.

12. A computer-readable storage including a program for controlling a computer to executes data transmission between a mobile station having a radio LAN apparatus and a host station, via a relay station having a plurality of access points, the program making a computer execute:
- temporarily storing transmission data in the radio LAN apparatus;
- detecting whether a link between the radio LAN apparatus and any one of the access points is established;
- reading the transmission data stored when it is detected at the detecting that a link between the radio LAN apparatus and any one of the access points has been established
- temporarily storing data acquired by the access point in the access point; and
- reading the data stored and then smoothing the data;
- detecting an amount of data left unread in the access point;
- generating a reading completion signal when it is detected at the detecting that the amount is zero; and
- starting the transmission of the data, from the access point that receives the reading completion signal.

* * * * *